US012337331B2

(12) United States Patent
Jeong et al.

(10) Patent No.: US 12,337,331 B2
(45) Date of Patent: Jun. 24, 2025

(54) CLASSIFICATION SYSTEM USING FLUIDIZED BED

(71) Applicant: LG Chem, Ltd., Seoul (KR)

(72) Inventors: Sung Woo Jeong, Daejeon (KR); In Yong Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/018,455

(22) PCT Filed: Jun. 17, 2022

(86) PCT No.: PCT/KR2022/008604
§ 371 (c)(1),
(2) Date: Jan. 27, 2023

(87) PCT Pub. No.: WO2023/080374
PCT Pub. Date: May 11, 2023

(65) Prior Publication Data
US 2024/0382976 A1 Nov. 21, 2024

(30) Foreign Application Priority Data
Nov. 2, 2021 (KR) ........................ 10-2021-0149249

(51) Int. Cl.
*B03B 4/06* (2006.01)

(52) U.S. Cl.
CPC ...................................... *B03B 4/06* (2013.01)

(58) Field of Classification Search
CPC ........ F27B 15/003; F27B 15/10; F27B 15/12; B03B 4/06
See application file for complete search history.

(56) References Cited

U.S. PATENT DOCUMENTS 3,374,052 A * 3/1968 Fan .......................... C01B 17/77 201/31
4,197,418 A * 4/1980 Lee ........................ B01J 8/1836 208/120.25
(Continued)

FOREIGN PATENT DOCUMENTS

CN 110433951 A 11/2019
JP H06343927 A 12/1994
(Continued)

OTHER PUBLICATIONS

English Translation of KR 101604146 B1 (Year: 2016).*
(Continued)

*Primary Examiner* — Joseph C Rodriguez
(74) *Attorney, Agent, or Firm* — Lerner David LLP

(57) ABSTRACT

A classification system using a fluidized bed according to the present invention includes: a fluidized bed classifier supplied with powder containing particles of different sizes, which entrains the powder into the fluidized gas, and then discharges coarse powder through a coarse powder outlet positioned in its lower portion. The system further includes a cyclone communicating with an upper portion of the fluidized bed classifier, which collects and discharges fine powder contained in the fluidized gas transferred from the fluidized bed classifier to a fine powder outlet positioned in its lower portion. Additionally, the system further includes a plurality of internal structures positioned in the fluidized bed in the fluidized bed classifier which reduce a size of a bubble of the fluidized gas.

8 Claims, 2 Drawing Sheets

(56) References Cited

U.S. PATENT DOCUMENTS

| | | | | |
|---|---|---|---|---|
| 4,325,833 | A * | 4/1982 | Scott | C10G 11/182 422/142 |
| 5,776,416 | A | 7/1998 | Oda | |
| 6,298,579 | B1 | 10/2001 | Ichitani et al. | |
| 10,093,863 | B2 * | 10/2018 | Mazanec | C10B 53/02 |
| 2003/0194356 | A1 | 10/2003 | Meier et al. | |
| 2011/0000827 | A1 | 1/2011 | Minami | |
| 2013/0165724 | A1 * | 6/2013 | Han | B01J 8/1818 585/447 |
| 2015/0001742 | A1 * | 1/2015 | Xu | B01J 8/0492 261/114.5 |
| 2016/0102032 | A1 * | 4/2016 | Du | C07C 1/20 585/323 |

FOREIGN PATENT DOCUMENTS

| | | | |
|---|---|---|---|
| JP | H08135917 | A | 5/1996 |
| JP | 2009183886 | A | 8/2009 |
| KR | 970029900 | A | 6/1997 |
| KR | 20010033641 | A | 4/2001 |
| KR | 20040111497 | A | 12/2004 |
| KR | 2010-0051319 | A | 5/2010 |
| KR | 101068517 | B1 | 9/2011 |
| KR | 20140146730 | A | 12/2014 |
| KR | 101604146 | B1 | 3/2016 |
| KR | 20170025565 | A | 3/2017 |
| KR | 20180031226 | A | 3/2018 |
| KR | 20210023797 | A | 3/2021 |
| KR | 20210096515 | A | 8/2021 |

OTHER PUBLICATIONS

Extended European Search Report for European Patent Application No. 22823308.6 dated Dec. 11, 2023. 7 pgs.

International Search Report for Application No. PCT/KR2022/008604 mailed Sep. 22, 2022, pp. 1-3. [See p. 2, categorizing the cited references].

* cited by examiner

【FIG. 1】
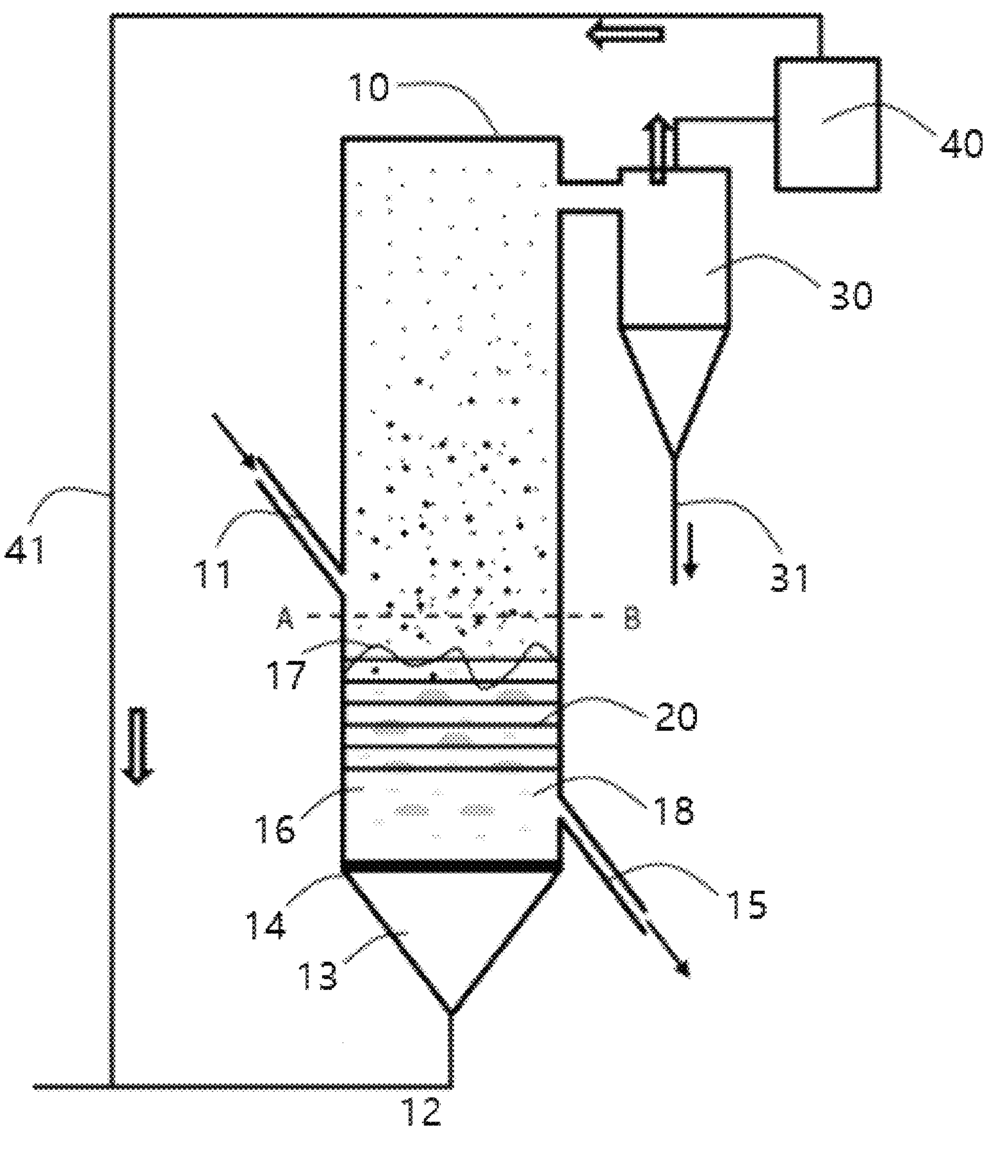

【FIG. 2】
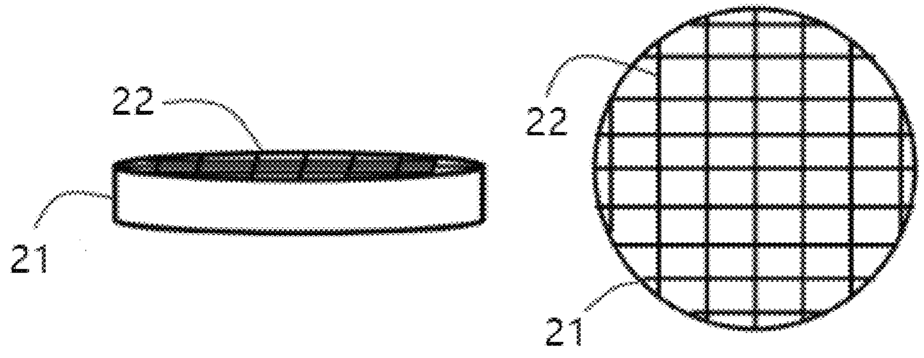
【FIG. 3】
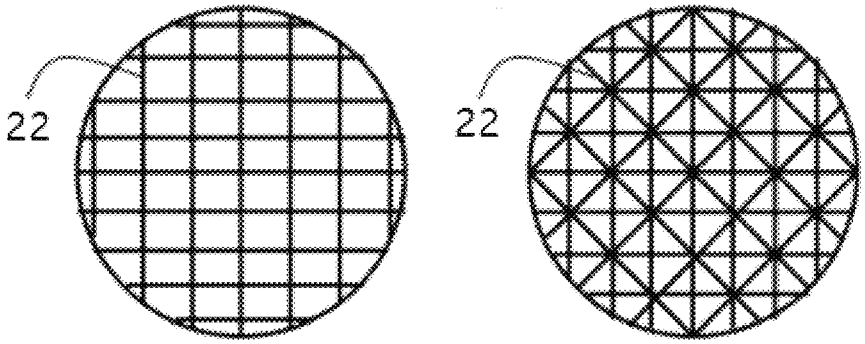
【FIG. 4】
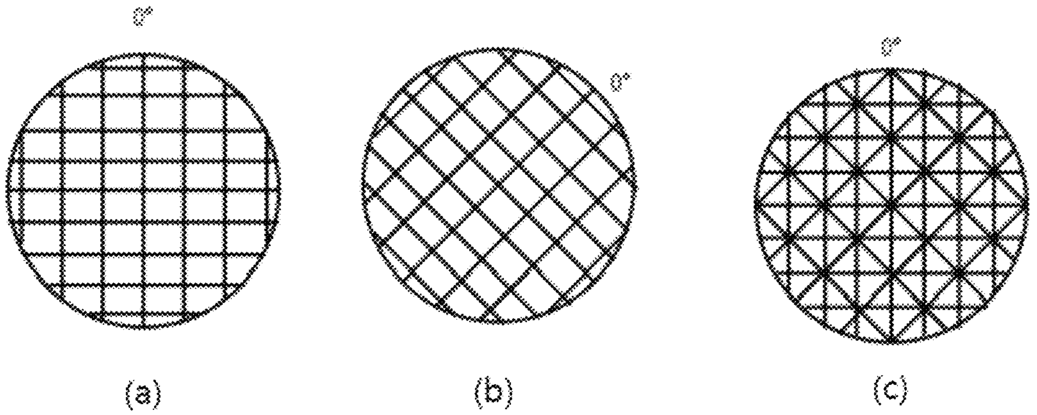

CLASSIFICATION SYSTEM USING FLUIDIZED BED

CROSS-REFERENCE TO RELATED APPLICATION(S)

The present application is a national phase entry under 35 U.S.C § 371 of International Application No. PCT/KR2022/008604 filed on Jun. 17, 2022 which claims priority from Korean Patent Application No. 10-2021-0149249 filed on Nov. 2, 2021, all of which are incorporated herein by reference.

TECHNICAL FIELD

The present invention relates to a classification system using a fluidized bed to classify powder based on a particle size, and more particularly, to a classification system which can classify powder based on a particle size by controlling differences in the flow and scattering characteristics of particles based on the particle size.

BACKGROUND ART

In various fields, an operation may be carried out to classify particle sizes of powder which is an aggregate of small particles. A classifier may be used as a device for classifying the particle sizes of the powder, and a mechanical classifier and an airflow classifier are conventionally used.

The mechanical classifier uses a mechanical part such as a sieve having a mesh. In this case, the particle size may be classified by allowing only a particle having a size smaller than a size of the mesh to pass through the sieve. The finer the particle size is (about 150 μm or less), the more frequently the sieve is clogged, which may result in a lower classification performance or difficult operation.

On the other hand, the airflow classifier uses a method of classifying the particle sizes by contact between particles of the powder and gas. The classification performance may be lower when throughput greater than or equal to saturation carrying capacity of the gas is required due to short residence time of the particles in the device.

DISCLOSURE

Technical Problem

An object of the present invention is to provide a system which can continuously classify particle sizes of powder without clogging by reducing a size of a bubble of fluidized gas to control the flow and scattering characteristics of a particle based on the particle size in classifying the particle sizes of the powder by using a fluidized bed classifier and a cyclone.

Technical Solution

In one general aspect, the present invention provides a classification system using a fluidized bed, the classification system including: a fluidized bed classifier supplied with powder containing particles of different sizes, flowing the powder into fluidized gas, and discharging coarse powder through a coarse powder outlet positioned in its lower portion; a cyclone communicating with an upper portion of the fluidized bed classifier, and collecting and discharging fine powder contained in the fluidized gas transferred from the fluidized bed classifier to a fine powder outlet positioned in its lower portion; and an internal structure positioned in the fluidized bed in the fluidized bed classifier and reducing a size of a bubble of the fluidized gas.

Advantageous Effects

According to the classification system according to the present invention, it is possible to continuously classify the particle sizes of the powder without clogging by including an internal structure for controlling the size of the bubble of the fluidized gas in the fluidized bed in the fluidized bed classifier to control the flow and scattering characteristics of the particle based on the particle size.

DESCRIPTION OF DRAWINGS

FIG. 1 is a view showing a classification system using a fluidized bed according to an embodiment of the present invention.

FIGS. 2 to 4 are views each specifically showing an internal structure according to an embodiment of the present invention.

BEST MODE

Terms and words used in the present specification and claims are not to be construed as a general or dictionary meaning but are to be construed as meanings and concepts meeting the spirit of the present invention based on a principle that the inventors can appropriately define the concepts of terms in order to describe their own inventions in best mode.

Hereinafter, the present invention will be described in more detail with reference to FIGS. 1 to 4 to assist the understanding of the present invention.

According to the present invention, provided is a classification system using a fluidized bed. The classification system using a fluidized bed may include: a fluidized bed classifier 10 supplied with powder containing particles of different sizes, flowing the powder into fluidized gas, and discharging coarse powder through a coarse powder outlet 15 positioned in its lower portion; a cyclone 30 communicating with an upper portion of the fluidized bed classifier 10, and collecting and discharging fine powder contained in the fluidized gas transferred from the fluidized bed classifier to a fine powder outlet 31 positioned in its lower portion; and an internal structure 20 positioned in a fluidized bed 16 in the fluidized bed classifier 10 and reducing a size of a bubble 18 of the fluidized gas.

In various fields, an operation may be conventionally carried out to classify particle sizes of the powder which is an aggregate of small particles. A classifier may be used as a device for classifying the particle sizes of the powder, and a mechanical classifier and an airflow classifier are conventionally used.

The mechanical classifier may use a mechanical part such as a sieve having a mesh. In this case, the particle size may be classified by allowing only a particle having a size smaller than a size of the mesh to pass through the sieve. The finer the particle is (about 150 μm or less), the more frequently the sieve is clogged, which may result in a lower classification performance or difficult operation.

On the other hand, the airflow classifier uses a method of classifying the particle sizes by contact between particles of the powder and gas. A classification performance may be lower when throughput greater than or equal to saturation carrying capacity of the gas is required due to short residence time of the particles in the device.

In this regard, the present invention provides a classification system using a fluidized bed, which may secure its throughput and classification ability, which are indicators of its classification performance, by classifying the particle sizes of the powder by controlling the flow and scattering characteristics of the particles based on the particle size and which has no problem of a lower performance due to clogging by using no sieve.

According to an embodiment of the present invention, the fluidized bed classifier 10 may be continuously supplied with the powder containing the particles of different sizes for classifying the particle sizes. Here, the powder may include the fine powder and the coarse powder. For example, the fine powder may indicate a particle having a diameter of 150 μm or less, and the coarse powder may indicate a particle having a diameter of more than 150 μm to 850 μm. Meanwhile, distinction between the fine powder and the coarse powder may not be an absolute matter. For example, the distinction may be made in such a manner that the coarse powder indicates powder discharged through the coarse powder outlet 15 positioned in the lower portion of the fluidized bed classifier 10, and the fine powder indicates powder discharged through the fine powder outlet 31 positioned in the upper portion of the fluidized bed classifier 10. In this case, a boundary between the coarse powder and the fine powder may be determined based on an operation condition of the fluidized gas.

The powder may be supplied into the fluidized bed classifier 10 through the particle inlet 11 positioned on a side portion of the fluidized bed classifier 10. The particle inlet 11 may have a downward inclination toward the fluidized bed classifier 10, through which the powder may be continuously supplied to the fluidized bed classifier 10.

The powder supplied to the fluidized bed classifier 10 may be accumulated in an upper portion of a gas distribution plate 14 installed in the lower portion of the fluidized bed classifier 10, and may form the fluidized bed 16 flowing by the fluidized gas which is moved upward through a gas chamber 13 positioned in the lower portion of the gas distribution plate 14.

According to an embodiment of the present invention, a fluidized gas injection pipe 12 may be installed in a bottom portion of the fluidized bed classifier 10. The fluidized gas may be introduced into the gas chamber 13 positioned in the lower portion of the fluidized bed classifier 10 through the fluidized gas injection pipe 12, and entrain the powder of the fluidized bed 16 while being moved upward through the gas distribution plate 14 from the gas chamber 13. Here, the fluidized gas is not limited to a particular type, may use any of various gases such as compressed air or oxygen for example, and may be fluidized using an inert gas such as nitrogen or helium when the particles contained in the powder are required not to come into contact with air.

The fluidized gas may be moved from the upper portion of the fluidized bed classifier 10 to the cyclone 30, discharged to the upper portion of the cyclone 30, and circulated through the fluidized gas injection pipe 12 for reuse.

According to an embodiment of the present invention, the fluidized bed classifier 10 may include the internal structure 20 positioned in the fluidized bed 16. The internal structure 20 may be positioned in the fluidized bed 16 in the fluidized bed classifier 10 to reduce the size of the bubble 18 of the rising fluidized gas. It is possible to control the scattering characteristic of the particles by reducing the size of the bubble 18 of the fluidized gas, and the continuous classification is thus possible without using a sieve. Therefore, there is no clogging when using a sieve, thus improving the classification performance.

The internal structure 20 may include a frame 21 corresponding to an inner circumferential surface of the fluidized bed classifier 10 and a wire 22 having a lattice structure formed in the frame 21.

The frame 21 may correspond to the inner circumferential surface of the fluidized bed classifier 10 to be closely fixed to an inner wall of the fluidized bed classifier 10, and simultaneously fix the wire 22 having the lattice structure formed in the frame 21.

The wire 22 may have a polygonal lattice structure. In detail, the wire 22 may be appropriately formed in a polygon such as a triangle, a square, a pentagon, and a hexagon to be advantageous in reducing the size of the bubble 18 within the frame 21.

A diameter of the wire 22 may be 0.1% or more, 0.5% or more, 0.7% or more and 1% or less, or 1.5% or less, or 2% or less of the diameter of the fluidized bed classifier 10. It is possible to form the lattice structure in the internal structure 20 by using the wire 22 having the diameter within the above range to control the scattering characteristic of the particles without disturbing the flow of the particles, thereby improving the classification ability of the fine powder and the coarse powder in the powder.

An opening area of the internal structure 20 may be 80% or more, 83% or more, 85% or more and 90% or less, 92% or less, or 95% or less of a cross-sectional area of the fluidized bed classifier 10. The size of the bubble 18 may be reduced without affecting the flow of the particles by designing the opening area of the internal structure 20 within the above range and a scattering amount of the particle may be prevented from being rapidly increased by properly controlling a linear velocity of the fluidized gas, thereby improving the classification ability based on the particle size.

The plurality of internal structures 20 may be installed at regular intervals in a height direction of the fluidized bed classifier 10. For example, the number of the internal structures 20 may be appropriately selected to adjust the size of the bubble 18 required based on the size of the particles in the powder, and as a specific example, four to ten internal structures may be installed.

When the plurality of internal structures 20 are installed, the internal structure 20 may have an interval of 0.05 m or more, 0.1 m or more, 0.15 m or more and 0.2 m or less, or 0.25 m or less with the adjacent internal structure 20. It is possible to increase an effect of reducing the size of the bubble 18 by adjusting the interval between the internal structures 20 within the above range, and in particular, to increase an effect of reducing the scattering of the coarse powder, which is a relatively large particle.

The internal structure 20 positioned at an uppermost of the plurality of internal structures 20 may be installed at a position corresponding to a height of a fluidized bed surface 17. In detail, the size of the bubble 18 may have a large effect on the scattering of the coarse powder, which is a relatively large particle. When the size of the bubble 18 is large, the coarse powder may scatter to be discharged to the upper portion of the fluidized bed classifier 10, which may result in the lower classification performance. Accordingly, it is possible to install the plurality of internal structures 20 in the fluidized bed 16, and install the internal structure 20 positioned at the uppermost of the plurality of internal structures 20 in vicinity of the height of the fluidized bed surface 17 to finally reduce the size of the bubble 18 just before the particles are ejected by the bubble 18 in the vicinity of the fluidized bed surface 17, thereby controlling the scattering characteristic of the particles.

The plurality of internal structures 20 may each be installed while being rotated 30° or more, 35° or more, 40° or more and 50° or less, or 55° or less with respect to the adjacent internal structure 20. For example, the plurality of internal structures 20 may be installed by cross-arranging the internal structure 20 as shown in (a) of FIG. 4 and the internal structure 20 as shown in (b) of FIG. 4 in which the internal structure 20 as shown in (a) of FIG. 4 is rotated 45° to the right. In this case, a cross-sectional view A-B may be as shown (c) of in FIG. 4. In this way, when the plurality of internal structures 20 are installed, it is possible to effectively reduce the size of the bubble 18 without the rapid increase in the linear velocity of the fluidized gas.

According to an embodiment of the present invention, the coarse powder outlet 15 may be positioned in the lower portion of the fluidized bed classifier 10. In detail, the coarse powder outlet 15 may be installed in the lower portion of the fluidized bed classifier 10, and for example, in a lower portion of the fluidized bed 16 formed of the powder, and the coarse powder can be continuously discharged and separated through the coarse powder outlet 15.

The coarse powder outlet 15 may have a downward inclination from the fluidized bed classifier 10, through which the coarse powder in the fluidized bed 16 can be continuously discharged to the outside of the fluidized bed classifier 10.

According to an embodiment of the present invention, the classification system may include the cyclone 30 for separating the fine powder in the powder. In detail, the cyclone 30 may communicate with the upper portion of the fluidized bed classifier 10, and the fluidized gas may be introduced thereto from the fluidized bed classifier 10. Here, the fluidized gas introduced from the fluidized bed classifier 10 may contain the fine powder scattering with the fluidized gas.

The cyclone 30 may have the fine powder outlet 31 positioned in its lower portion. In detail, the fine powder introduced together with the fluidized gas from the fluidized bed classifier 10 may be separated and discharged to the lower portion of the cyclone 30 through the fine powder outlet 31.

According to an embodiment of the present invention, the fluidized gas discharged to the upper portion of the cyclone 30 may pass through a dust collector 40 to additionally remove solid particles, may then be transferred through a gas circulation pipe 41, and may join the fluidized gas injection pipe 12 to be circulated to the fluidized bed classifier 10. The dust collector 40 can remove fine powder which may remain in the fluidized gas so as to prevent the fine powder from passing into the coarse powder outlet 15 positioned in the lower portion of the fluidized bed classifier 10 when the fluidized gas is circulated and supplied to the lower portion of the fluidized bed classifier 10 for reuse.

The scattering of the particles in the fluidized bed 16 may mainly occur due to destruction of the bubble 18 on the fluidized bed surface 17, and a retention amount of the particle may be exponentially decreased because a ratio of the particles converted to a descending flow may be increased as the particles rise from the fluidized bed surface 17. A minimum height (or transportation disengaging height, i.e. TDH) at which the retention amount of the particles is constant from the height of the fluidized bed surface 17 regardless of the height, may vary depending on the size of the bubble formed from the fluidized gas. In the present invention, it is possible to install the internal structure 20 in the fluidized bed 16, and adjust the shape, number and disposition of the internal structure 20 to control the size of the bubble 18 without disturbing the flow of the particles, thereby controlling the TDH, which may implement excellent classification ability and high throughput.

The spirit of the present disclosure has been illustratively described hereinabove. It will be appreciated by those skilled in the art that various modifications and alterations are possible without departing from the essential characteristics of the present invention. Accordingly, the embodiments disclosed in the present invention are not to limit the spirit of the present invention, but are to describe the spirit of the present invention. The scope of the present invention is not limited to these embodiments. The scope of the present invention should be interpreted by the following claims, and it should be interpreted that all the spirits equivalent to the following claims fall within the scope of the present invention.

Hereinafter, the present invention is described in more detail by way of example. However, the following examples are intended to illustrate the present invention, and it is clear to those skilled in the art that various changes and modifications are possible within the scope and spirit of the present invention, and the scope of the present invention is not limited only to these examples.

INVENTIVE EXAMPLES

Inventive Example 1

The particle size of the powder is classified using the classification system using a fluidized bed according to FIG. 1 below.

In detail, the powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thus allowing the powder to flow using the fluidized gas moved to the upper portion. Here, the same powder is used in Inventive Examples 2 to 5 and Comparative Examples 1 and 2 below.

Six internal structures 20 are installed in the fluidized bed 16 in the fluidized bed classifier 10 in the height direction of the fluidized bed classifier 10. The diameter of the wire 22 of the internal structure 20 is adjusted to be 2% of the diameter of the fluidized bed classifier 10, and the interval between the internal structures 20 is adjusted to 0.2 m. In addition, the wire 22 of each internal structure 20 is formed in a rectangular lattice structure as shown on the left of FIG. 3, the opening area is designed to be 85% of the cross-sectional area of the fluidized bed classifier 10, and the internal structure 20 positioned at the uppermost of the six internal structures 20 is installed in the vicinity of the height of the fluidized bed surface 17.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the classification ability of the fine powder and the coarse powder is excellent, and the throughput per hour is high because of the continuous classification possible based on the particle size.

Inventive Example 2

The particle size of the powder is classified using the classification system using a fluidized bed according to FIG. 1 below.

In detail, the powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thus allowing the powder to flow using the fluidized gas moved to the upper portion.

Six internal structures 20 are installed in the fluidized bed 16 in the fluidized bed classifier 10 in the height direction of the fluidized bed classifier 10. The diameter of the wire 22 of the internal structure 20 is adjusted to be 1.5% of the diameter of the fluidized bed classifier 10, and the interval between the internal structures 20 is adjusted to 0.15 m. In addition, the wire 22 of each internal structure 20 is formed in a triangular lattice structure as shown on the right of FIG. 3, the opening area is designed to be 80% of the cross-sectional area of the fluidized bed classifier 10, and the internal structure 20 positioned at the uppermost of the six internal structures 20 is installed in the vicinity of the height of the fluidized bed surface 17.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the classification ability of the fine powder and the coarse powder is excellent at a level similar to that of Inventive Example 1, and the throughput per hour is high because of the continuous classification possible based on the particle size.

Inventive Example 3

The particle size of the powder is classified using the classification system using a fluidized bed according to FIG. 1 below.

In detail, the powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thus allowing the powder to flow using the fluidized gas moved to the upper portion.

Six internal structures 20 are installed in the fluidized bed 16 in the fluidized bed classifier 10 in the height direction of the fluidized bed classifier 10. The diameter of the wire 22 of the internal structure 20 is adjusted to be 1.8% of the diameter of the fluidized bed classifier 10, and the interval between the internal structures 20 is adjusted to 0.1 m. In addition, the wire 22 of each internal structure 20 is formed in the rectangular lattice structure as shown on the left of FIG. 3, and the opening area is designed to be 80% of the cross-sectional area of the fluidized bed classifier 10. In addition, the six internal structures 20 are installed by cross-arranging the internal structure 20 as shown in (a) of FIG. 4 and the internal structure 20 as shown in (b) of FIG. 4 in which the internal structure 20 as shown in (a) of FIG. 4 is rotated 45° to the right, and the uppermost internal structure 20 is installed in the vicinity of the height of the fluidized bed surface 17.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the classification ability of the fine powder and the coarse powder is excellent at a level similar to those of Inventive Examples 1 and 2, and the throughput per hour is high because of the continuous classification possible based on the particle size.

Inventive Example 4

The particle size of the powder is classified using the classification system using a fluidized bed according to FIG. 1 below.

In detail, the powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thus allowing the powder to flow using the fluidized gas moved to the upper portion.

Four internal structures 20 are installed in the fluidized bed 16 in the fluidized bed classifier 10 in the height direction of the fluidized bed classifier 10. The diameter of the wire 22 of the internal structure 20 is adjusted to be 3.5% of the diameter of the fluidized bed classifier 10, and the interval between the internal structures 20 is adjusted to 0.3 m. In addition, the wire 22 of each internal structure 20 is formed in the rectangular lattice structure as shown on the left of FIG. 3, the opening area is designed to be 75% of the cross-sectional area of the fluidized bed classifier 10, and the internal structure 20 positioned at the uppermost of the four internal structures 20 is installed in the vicinity of the height of the fluidized bed surface 17.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the size of the bubble is not properly controlled because the interval between the internal structures 20 is wide, the flow of the particles is disturbed due to a narrow opening area of the internal structure 20, and the linear velocity of the fluidized gas is partially increased to strengthen the scattering movement of the coarse powder. Therefore, the classification ability of the fine powder and coarse powder is slightly lower compared to Inventive Examples 1 to 3.

Inventive Example 5

The particle size of the powder is classified using the classification system using a fluidized bed according to FIG. 1 below.

In detail, the powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thus allowing the powder to flow using the fluidized gas moved to the upper portion.

Three internal structures 20 are installed in the fluidized bed 16 in the fluidized bed classifier 10 in the height direction of the fluidized bed classifier 10. The diameter of the wire 22 of the internal structure 20 is adjusted to be 5% of the diameter of the fluidized bed classifier 10, and the interval between the internal structures 20 is adjusted to 0.3 m. In addition, the wire 22 of each internal structure 20 is formed in the rectangular lattice structure as shown on the left of FIG. 3, the opening area is designed to be 70% of the cross-sectional area of the fluidized bed classifier 10, and the internal structure 20 positioned at the uppermost of the three internal structures 20 is installed at a height of 0.3 m lower than the height of the fluidized bed surface 17.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the size of the bubble 18 of the fluidized gas is not properly controlled because the interval between the internal structures 20 is wide and the position of the uppermost internal structure 20 is not proper, the flow of the particles is disturbed due to a narrow opening area of the internal structure 20, and the linear velocity of the fluidized gas is partially increased to strengthen the scattering movement of the coarse powder. Therefore, the classification ability of the fine powder and coarse powder is very low compared to Inventive Examples 1 to 4.

COMPARATIVE EXAMPLES

Comparative Example 1

The powder containing the particles of different sizes is introduced through the particle inlet 11 of the fluidized bed classifier 10, and the fluidized gas transferred through the fluidized gas injection pipe 12 is introduced into the gas chamber 13 and then passes through the gas distribution plate 14, thereby allowing the powder to flow using the fluidized gas moved to the upper portion.

The coarse powder is discharged through the coarse powder outlet 15 installed in the lower portion of the fluidized bed classifier 10, and the cyclone 30 is supplied with the fluidized gas moved to the upper portion of the fluidized bed classifier 10 and the fine powder scattering together with the fluidized gas.

The fine powder is separated through the fine powder outlet 31 positioned in the lower portion of the cyclone 30, and the fluidized gas is discharged to its upper portion to separate the solid particles by using the dust collector 40, and then joins the fluidized gas injection pipe 12 through the gas circulation pipe 41 to be circulated to the fluidized bed classifier 10.

In this case, the size of the bubble 18 of the fluidized gas is not controlled due to the absence of the internal structure 20, and the classification ability of the fine powder and the coarse powder is thus very low compared to Inventive Examples 1 to 5.

Comparative Example 2

Comparative Example 2 is carried out in the same manner as in Inventive Example 1 except that the internal structure 20 is installed in an upper region higher than the height of the fluidized bed surface 17, not in the fluidized bed 16 as in Inventive Example 1.

In this case, the internal structure 20 fails to affect the control of the size of the bubble 18 and does not show the effect in Inventive Example 1, and the classification ability of the fine powder and coarse powder is very low at a level similar to that of Comparative Example 1.

The invention claimed is:

1. A classification system using a fluidized bed, the classification system comprising:

a fluidized bed classifier configured to be supplied with a powder containing particles of different sizes, the fluidized bed classifier being configured to entrain the powder into a fluidized gas, and the fluidized bed classifier being configured to discharge a coarse powder of the powder through a coarse powder outlet positioned in a lower portion of the fluidized bed classifier;

a cyclone communicating with an upper portion of the fluidized bed classifier, the cyclone being configured to collect a fine powder of the powder entrained in the fluidized gas transferred from the fluidized bed classifier, and the cyclone being configured to discharge the collected fine powder from a fine powder outlet positioned in a lower portion of the cyclone; and an internal structure positioned in a fluidized bed region of the fluidized bed classifier, the internal structure being configured to reduce a size of a bubble of the fluidized gas, wherein the internal structure includes a frame conforming to an inner circumferential surface of the fluidized bed classifier and includes a wire having a lattice structure located in the frame, wherein a diameter of the wire is 0.1% to 2% of a diameter of the fluidized bed classifier, and wherein an open area of the internal structure is 80% to 95% of a cross-sectional area of the fluidized bed classifier.

2. The classification system of claim 1, wherein the wire has a polygonal lattice structure.

3. The classification system of claim 1, wherein the internal structure includes a plurality of internal structures located at regular intervals in a height direction of the fluidized bed classifier.

4. The classification system of claim 3, wherein the plurality of internal structures are located at intervals of 0.05 m to 0.25 m with respect to one another.

5. The classification system of claim 3, wherein an uppermost one of the plurality of internal structures is positioned at a height corresponding to a surface of a fluidized bed within the fluidized bed classifier.

6. The classification system of claim 1, wherein the internal structure includes a plurality of internal structures each of which is installed in a position rotated 30° to 55° with respect to an adjacent one of the internal structures.

7. The classification system of claim 1, wherein the classification system is configured such that the fluidized gas is supplied to the fluidized bed classifier through a fluidized gas injection pipe located in a bottom portion of the fluidized bed classifier, and then the fluidized gas is moved upward while entraining the powder, after which the fluidized gas is moved to the cyclone from the upper portion of the fluidized bed classifier, and then the fluidized gas is discharged to an upper portion of the cyclone to be circulated to the fluidized gas injection pipe.

8. The classification system of claim 7, wherein, when the fluidized gas is discharged to the upper portion of the cyclone, the fluidized gas passes through a dust collector, and the fluidized gas is then transferred to a gas circulation pipe, which transfers the fluidized gas to the fluidized gas injection pipe to be circulated to the fluidized bed classifier.

* * * * *